United States Patent [19]

Smith et al.

[11] 4,162,187
[45] * Jul. 24, 1979

[54] PROCESS FOR PRODUCTION OF SODIUM THIOSULFATE AND SODIUM HYDROXIDE

[75] Inventors: Glen C. Smith; Frederick W. Sanders, both of Chillicothe, Ohio

[73] Assignee: The Mead Corporation, Dayton, Ohio

[*] Notice: The portion of the term of this patent subsequent to May 17, 1994, has been disclaimed.

[21] Appl. No.: 796,078

[22] Filed: May 12, 1977

Related U.S. Application Data

[63] Continuation-in-part of Ser. No. 468,471, May 9, 1974, Pat. No. 4,024,229, which is a continuation-in-part of Ser. No. 87,504, Nov. 6, 1970, abandoned.

[51] Int. Cl.² ............................................. D21C 11/04
[52] U.S. Cl. ...................................... 162/29; 162/30 R; 252/188; 423/642; 162/31
[58] Field of Search ................... 423/562, 642, 514; 252/447, 188; 162/82, 29, 30 K, 31, 51, 65, 30 R

[56] References Cited

U.S. PATENT DOCUMENTS

| | | | |
|---|---|---|---|
| 1,083,930 | 1/1914 | Hagemann | 260/409 |
| 1,146,363 | 7/1915 | Statham | 252/444 |
| 1,488,829 | 4/1924 | Plumstead | 423/514 |
| 2,135,879 | 11/1938 | Shiffler | 423/562 |
| 2,365,729 | 12/1944 | Schumacher | 423/558 |
| 2,459,907 | 1/1949 | Winslow | 260/580 |
| 2,479,451 | 8/1949 | Young | 252/428 |
| 2,722,504 | 11/1955 | Fleck | 208/110 |
| 2,944,928 | 7/1960 | Kibruk | 162/32 |
| 3,210,235 | 10/1965 | Ferrigan | 423/573 R |
| 3,216,887 | 11/1965 | Landmark | 162/82 |
| 3,249,522 | 5/1966 | Bolner | 204/92 |
| 3,396,123 | 8/1968 | Urban | 252/428 |
| 3,409,520 | 11/1968 | Bolner | 204/101 |
| 3,423,180 | 1/1969 | Hockstra | 423/573 R |
| 3,470,061 | 9/1969 | Barker | 162/32 |
| 3,471,254 | 10/1969 | Urban | 425/370 |
| 3,525,666 | 8/1970 | Brannland | 423/526 |
| 3,536,537 | 10/1970 | Solomon | 252/182.1 |
| 3,554,858 | 1/1971 | Timpe | 162/30 R |
| 3,560,329 | 2/1971 | Nelson | 162/30 R |
| 3,594,125 | 7/1971 | Hamblin | 423/573 R |
| 3,652,407 | 3/1972 | Paleos | 162/30 R |
| 3,666,405 | 5/1972 | Wensel | 423/220 |
| 3,701,824 | 10/1972 | Prahais et al. | 162/51 |
| 3,888,967 | 6/1975 | Andersson | 423/514 |
| 4,024,229 | 5/1977 | Smith et al. | 162/82 |
| 4,053,352 | 10/1977 | Hultman | 423/514 |

FOREIGN PATENT DOCUMENTS

700933 12/1964 Canada.
2113611 6/1972 France.

OTHER PUBLICATIONS

"Some Ideas on Polysulfide Pulping", Venemark, Svensk Papperstidning, vol. 67, pp. 157-166 (1964).

Primary Examiner—S. Leon Bashore
Assistant Examiner—Peter F. Kratz
Attorney, Agent, or Firm—Biebel, French & Nauman

[57] ABSTRACT

Sodium sulfide or sodium hydrosulfide is oxidized to form sodium polysulfide and sodium hydroxide which may be further oxidized to sodium thiosulfate and sodium hydroxide. The oxidant is air, oxygen or oxygen in mixture with other gases, the reductant is aqueous sodium sulfide or sodium hydrosulfide and the reaction is carried out with both reactants in non-flooded contact with a solid catalyst material, of which a typical example is a particulate carbon treated with polytetrafluoroethylene (PTFE). The reaction is typically conducted at atmospheric pressure and without the application of heat, with the oxidant and the reductant being in interfacial contact with each other, but only, insofar as possible, at sites where both are simultaneously in contact with a catalyst which is prevented from being flooded by either the oxidant or reductant.

7 Claims, 4 Drawing Figures

PROCESS FOR PRODUCTION OF SODIUM THIOSULFATE AND SODIUM HYDROXIDE

CROSS-REFERENCE TO RELATED APPLICATIONS

This application is a continuation-in-part of Ser. No. 468,471, now U.S. Pat. No. 4,024,229, filed May 9, 1974, as a continuation-in-part of Ser. No. 87,504, filed Nov. 6, 1970, now abandoned.

BACKGROUND OF THE INVENTION

This invention relates to a system for the production of sodium polysulfide for use in treatment of lignocellulose materials and more particularly to a basically new redox system for the simultaneous production of sodium hydroxide and sodium polysulfide which may be further oxidized to sodium thiosulfate and sodium hydroxide.

DESCRIPTION OF THE PRIOR ART

A variety of basically different procedures are known in which sodium polysulfide is obtained, either as a major product or as a minor by-product. These include electrochemical operations, redox processes and catalytic processes.

U.S. Pat. No. 3,249,522 discloses the use of hydrogen sulfide gas as the fuel in an electrochemical fuel cell, the products being sulfur, sulfides, polysulfides, and the generated current. The fuel cell itself includes an anode and a cathode separated by an ion exchange membrane, the anode being carbon catalyzed with platinum and the cathode being carbon catalyzed with nickel. Hydrogen sulfide is fed into the anode compartment and oxygen is introduced into the cathode compartment, the electrolyte being alkaline. The process involves oxidation of the hydrogen sulfide at the anode and reduction of oxygen at the cathode.

U.S. Pat. No. 3,409,520 describes an electrochemical system for removal of hydrogen sulfide gas from a natural gas mixture, the system being electrolytic in nature. The electrolysis cell includes an anode spaced and separated from the cathode by a diffusion barrier. With an acid electrolyte, the anodic oxidation product is sulfur while hydrogen gas is formed at the cathode. When the electrolyte is basic, the anodic oxidation product is polysulfide with hydrogen gas formed at the cathode. This system requires the application of current from an external source.

The catalytic oxidation of hydrogen sulfide in an alkaline solution to produce sulfur is described in U.S. Pat. No. 3,471,354. The catalyst is a phthalocyanine complex which is soluble in aqueous sulfide and insoluble in sulfide-free aqueous solutions, the catalyst being recovered as a curd and recycled.

U.S. Pat. No. 2,135,879 describes the air oxidation of calcium hydrosulfide, i.e., the reaction product of lime or calcium hydroxide and hydrogen sulfide, using a nickel sulfide catalyst which produces polysulfide, thiosulfate and sulfate in the ratio of 74:73:17. To increase the amount of polysulfide, 0.1% to 1.0% of hydrogen sulfide gas is admixed with the air oxidant to provide an excess of hydrogen sulfide in the oxidation stage.

German Pat. No. 326,159 also produces polysulfide from hydrogen sulfide by dissolving it in alkali and oxidizing in the presence of a catalyst such as iron, manganese or aluminum oxides or hydroxides.

It is known, and the prior art has attempted in various ways to generate polysulfide from the various forms of sulfur available in the pulping and recovery cycle. For example, U.S. Pat. No. 3,210,235 treats a portion of the green liquor to produce hydrogen sulfide by a carbonation procedure, the hydrogen sulfide being thereafter stripped and converted, at a high temperature and in the presence of catalyst, to produce elemental sulfur a portion of which is added to the pulping liquor and a portion of which is converted to sulfur dioxide used in the oxidation of hydrogen sulfide.

U.S. Pat. No. 3,331,732 treats green liquor in a scrubber with flue gas, the resulting product is then treated in a stripper to produce hydrogen sulfide gas which is then processed in a Claus type reactor.

U.S. Pat. No. 3,560,329 and companion Pat. No. 3,650,889 treat black liquor, prior to combustion in a recovery furnace, with sodium bicarbonate to produce hydrogen sulfide gas which is then treated in a Claus reactor to produce elemental sulfur. By treating black liquor, the sulfidity thereof is said to be reduced, thus reducing the sulfidity of the liquor being burned in the recovery furnace, thereby reducing sulfur losses.

U.S. Pat. No. 3,525,666 reuses the sulfur content of black liquor to prepare white liquor for kraft processing by carbonating the black liquor to a pH below 11 using combustion gases containing at least 15% $CO_2$. Hydrogen sulfide gas is stripped and oxidized to sulfur using a Claus process reactor.

U.S. Pat. No. 3,554,858 treats black liquor to an acid pH to liberate hydrogen sulfide and to precipitate the organic material which is thereafter separated to produce a first mother liquor. A second mother liquor is obtained after the smelt is added to water, the two liquors being combined and recausticized to form a lime mud and an aqueous sodium hydroxide solution, hydrogen sulfide being added to the hydroxide solution to produce white liquor. Reference is also made to U.S. Pat. No. 3,594,125.

In the processing of pulp, it is known that the use of sodium polysulfide, (hereinafter referred to as polysulfide), in the cooking liquor increases yield, (see U.S. Pat. No. 3,216,887 to Landmark, and the patents and publications discussed therein). Various procedures for forming polysulfide are discussed including, for example, dissolving sulfur in aqueous sodium hydroxide or sulfide solution. Also discussed is the production of polysulfide by the air oxidation of neutral sodium hydrogen sulfide. Landmark also states that white liquor is strongly alkaline and its sulfide is not easily oxidized by air. Moreover, oxidation of white liquor will not give sodium polysulfide but sodium thiosulfate. He proposes to admix white and black liquor and to oxidize the sulfide to produce polysulfide and thiosulfate. A similar process is disclosed in U.S. Pat. No. 3,723,242 where a black liquor-white liquor mixture is oxidized in the presence of the wood chips.

Canadian Pat. No. 814,882, and the reference material cited therein, also describes the advantages of polysulfide pulping, and specifically describes an adsorption process for the preparation of polysulfide pulping liquor in which hydrogen sulfide gas is adsorbed on activated carbon in the presence of air or oxygen, the hydrogen sulfide being oxidized to elemental sulfur which is deposited on the carbon. Once the carbon is saturated with sulfur, the sulfur is leached out by an alkaline solution. Best results are said to be obtained by saturating the hydrogen sulfide with water vapor prior to contact with the carbon and by removal of the formed sulfur by alkaline leaching in order to leave some alkaline residue for neutralization of the sulfuric acid formed during the reaction.

U.S. Pat. No. 3,470,061 describes generation of polysulfide by use of insoluble manganese oxide compounds which act as the oxidizing agents and which are regenerated after use by heating in air to raise the manganese oxidant to the next higher oxidation state. This latter patent also discusses the shortcomings of the procedures described in U.S. Pat. No. 3,216,887, supra, as well as the procedures described in U.S. Pat. Nos. 3,210,235 and 2,944,928.

It has also been suggested that polysulfide can be produced by electrolytically oxidizing a sulfide solution obtained from the green liquor by an evaporator-crystallizer which separates the green liquor into a sulfide solution and a carbonate solution. See, Venemark, "Some Ideas on Polysulfide Pulping", *Svensk Papperstidn.* 67 (1963), pp. 157–166. As an alternative to the electrolytic oxidation of the sulfide solution, it is proposed that the hydrogen sulfide can be expelled with carbon dioxide and converted to sulfur.

U.S. Pat. No. 3,423,180 to Hoekstra discloses a process for oxidizing a sulfide compound to elemental sulfur, sulfite, thiosulfate, sulfate, or dithionate by contacting the sulfide solution with oxygen in the presence of a solid catalyst and a sulfur solvent. The catalyst may be a metallic sulfide or a metal phthalocyanine on a suitable carrier material. A further Hoekstra Pat. No. 3,457,046, teaches how polysulfide can be produced in such a system by controlling the amount of oxygen entering the oxidation zone.

In the field of catalysis, it is known that certain finely divided materials increase the rate of reaction. For example, finely divided nickel and cobalt have been used as catalysts in the hydrogenation of vegetable oils. Improved results are said to have been obtained by the use of thin foils or flakes which remain more easily dispersed than do fine powders (see for example U.S. Pat. No. 1,083,930).

U.S. Pat. No. 1,146,363 describes the use of carbon in granular form as a catalytic or purifying agent, the carbon being in a column or percolator in which liquid is flowed through a bed of granular carbon.

U.S. Pat. No. 2,365,729 describes the oxidation of an acid solution of ferrous sulfate to ferric sulfate in which granular activated carbon containing absorbed oxygen or air is used as the catalyst. The carbon is suspended in the liquid, and the oxidant is bubbled through the suspension, or the oxidant is diffused through the liquid by a diffuser made of carbon, or the liquid and oxidant are concurrently passed through a packed tower or column.

U.S. Pat. No. 2,459,907 of Jan. 25, 1949, relates to a method of conducting chemical reactions by passing the reactants through a porous carbon column made by mixing carbon particles and pitch binder together, forming by heat and pressure, and baking to graphitize the carbon. The carbon column may contain catalytic inclusions. The purpose of the column is to reduce the thickness of the liquid reactant at the catalytic surface.

U.S. Pat. No. 1,284,488 of Nov. 12, 1918, also discloses a method of reducing the thickness of a liquid reactant on a catalytic surface. This is done by centrifugal force, which thins the liquid film and shortens the diffusion time necessary for the gaseous reactant to reach the surface of the catalyst.

Reference is also made to U.S. Pat. No. 3,666,405 of May 30, 1972, relating to reaction between two phases, one of which has a higher wettability with respect to a porous body. Preferably, the porous body has both large and small pores so that when the fluid phase with the lower wettability is introduced under a higher hydrostatic pressure than the fluid phase having the higher wettability, the smaller pores will be filled with the higher wettability fluid and the larger pores with the lower wettability fluid, thus forming a large interface between the two fluid phases. Alternatively, it is disclosed that the porous body may have a multiplicity of uniformly sized pores of two different wetting properties. It is stated that this may be achieved by constructing the porous body of a mixture of metal and resinous material or making the porous body of or coating the interior of the pores with various hydrophobic resinous material.

Canadian Pat. No. 700,933 of Dec. 29, 1964, describes a system for the electrolysis of sodium chloride brine in which the cathode is porous and supplied with oxygen gas to prevent formation or evolution of hydrogen. In one form, the cathode compartment contains a slurry of particulate solids which is agitated by the air stream or by mechanical agitation. The particulate material may be graphite and coated with a hydrophobic material such as tetrafluoroethylene.

Finally, reference is made to several additional patents which also disclose, in one form or another, catalyst-plastic combinations. Fleck U.S. Pat. No. 2,722,504 relates to conducting petro-chemical reactions with a solid catalyst material that has a minor amount of silicone resin on its surface. Young in U.S. Pat. No. 2,479,451 uses polytetrafluoroethylene resin as a binder for powdered catalyst materials in order to permit formation of a tablet or pellet. Urban U.S. Pat. No. 3,396,123 is similar. There catalyst-impregnated carrier materials in powder form are deposited on a plastic substrate to form a composite which is readily separated from the distillate in petroleum sweetener reactions.

The present invention provides a simple and efficient polysulfide generating system and thus fulfills a need in the pulping industry by providing a polysulfide and thiosulfate generating and recovery system adaptable to present kraft pulping and recovery procedures and equipment.

SUMMARY OF THE INVENTION

In accordance with the present invention sodium polysulfide and sodium hydroxide are prepared by a reduction-oxidation process in which sodium sulfide or sodium hydrosulfide in an aqueous solution are oxidized in the presence of a solid electronically conductive catalyst material. The oxidant is oxygen, air or a mixture of oxygen with other gases, while the reductant is the sulfide or hydrosulfide in an aqueous solution. The electronically conductive catalyst, which is relatively inert chemically with respect both to the oxidant and the reductant, is believed to function by conducting electrons from contacting reductant molecules or ions to contacting oxidant molecules or ions, thus expediting the transfer of electrons involved in the reaction. Unlike known electrochemical systems, e.g., electrolysis or fuel cells in which the anode and cathode are separated by barriers or membranes and wherein oxidation takes place on one electrode and reduction on the other, the system of the present invention involves contiguous reactions of oxidation and reduction at the catalyst material and does not require the use of membranes or barriers.

The reactions involving oxidation of sulfide are known for their tendency to produce predominately thiosulfate instead of polysulfide especially if the reductant is strongly alkaline. In contrast, the new redox systems of this invention produce predominantly polysulfide but may also be used to further oxidize the polysulfide to thiosulfate. This is accomplished in accordance with this invention by bringing the oxidant and the reductant simultaneously into contact with the catalyst and into contact with each other, but minimizing the contact of the oxidant with the reductant except at the locus where both are in contact with the catalyst material. In such systems according to the invention, the oxidant and reductant form an interface, the catalyst material being positioned at the interface and maintained simultaneously in contact with both the reductant and oxidant.

An important aspect of the present invention is preventing the solid catalyst material from being in exclusive contact with the liquid reactant, that is, the reductant. Likewise the solid catalyst material must not be in exclusive contact with the gaseous reactant, that is, the oxidant. When used in describing this invention, the term "flooded" means that the catalyst material is in exclusive contact with either oxidant or reductant. If the catalyst material of the present invention is flooded, the preferred polysulfide producing reactions stop for all practical purposes.

Considerations in catalysis and electrochemistry may be applicable in some degree to the new discoveries of this invention. For example, if the catalyst material of the present invention is considered an electrode, even though no lead wires are attached for supplying or removing electrical current, both oxidation and reduction take place at the same "electrode", i.e., one member acts as both an anode and a cathode and both the oxidation product and the reduction product are generated at the same "electrode" member. While such a member could be characterized as a "mixed potential electrode", the kinetics of the system of the present invention are not sufficiently defined or understood as to provide a complete explanation of the reaction mechanism. Similarly, in view of the solid nature of the conductive material, elements of heterogeneous catalysis would seem to be present since the effect of the present system is to increase the rates of the polysulfide producing reactions substantially above those possible in the absence of the solid catalyst material. Characterization by a term such as heterogeneous catalysis, likewise, does not provide a complete explanation or understanding of the reaction mechanism.

Regardless of whether the explanation of the reaction mechanism is based on catalysis, electrochemistry or some combination of disciplines, data obtained provide the following general rules applicable to the present invention:

(a) The oxidant and the reductant should be capable of forming an interface or boundary;
(b) Flooding of the catalyst material should be avoided;
(c) Both oxidant and reductant should be in contact with each other and the catalyst material; and
(d) Intermixing of the oxidant and reductant outside the locus or region of catalyst material should be avoided.

The procedures and system of the present invention involve a basically new concept and mode of operation in preparation of chemical materials by a reduction-oxidation reaction from reactants containing chemical elements of the desired product but in a valence state different from that in the desired product. This new operation involves the controlled contact of a fluid oxidant and a fluid reductant in which the contact is primarily at an interface in the locus of a solid catalyst material, the latter restricted contact being an essential element of the system. This controlled contact is in contradistinction to intermixing of the reactants as bubbles of gas in a liquid, as by a diffuser, and the reaction is carried out at that locus of contact between the oxidant, reductant and solid catalyst material. For the purpose of simplication, the following terms has been developed to identify the process and the essential elements thereof.

"Contacogen" (trademark of the Mead Corporation, assignee of the present invention) means the electronically conductive solid material which forms the locus of the interfacial contact for the reductant and oxidant and which should be simultaneously contacted by them to produce the desired reaction, i.e., a catalyst.

Of particular interest is the fact that the present system offers unique advantages in the production of polysulfide and thiosulfate containing liquors for use in the treatment of lignocellulose material. This unique advantage derives from the fact that polysulfide can be readily and continuously produced at ambient conditions, although higher pressures, and higher temperatures below the decomposition temperature of the reactants or products may be used, and polysulfide is produced simultaneously with sodium hydroxide, without the need for regeneration of the oxidant.

Accordingly, it is a primary object of the present invention to provide a system for the production of a polysulfide liquor which may be further oxidized to a thiosulfate liquor.

Other objects and advantages of the present invention will be apparent from the following description, the accompanying drawing and the appended claims.

DETAILED DESCRIPTION OF THE INVENTION

Figure 1:
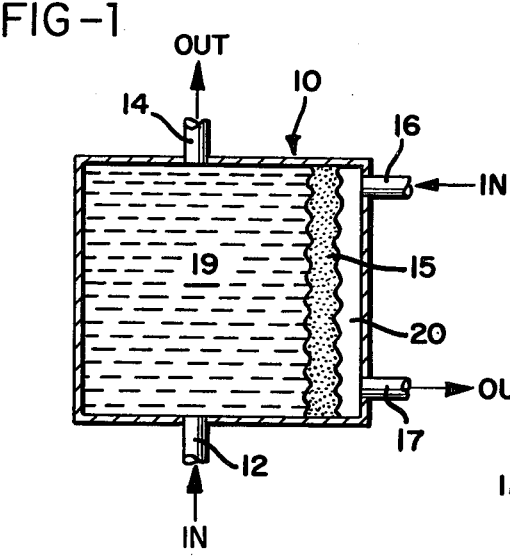
FIG. 1 is a schematic illustration of a generator in accordance with the present invention.

The reduction-oxidation system of the present invention in the case of sodium sulfide involves the following reactions:

| | Oxidation | |
|---|---|---|
| $S^= \rightarrow S^* +$ | $2e$ | (1) |
| | Reduction | |
| $2H_2O + O_2 +$ | $4e \rightarrow 4OH^-$ | (2) |
| | Combined | |
| $2Na_2S + 2H_2O + O_2 \rightarrow 2S + 4NaOH$ | | (3) |

The elemental sulfur then combines with the sodium sulfide to form $Na_2S_x$, the latter being polysulfide in which the value of x is above 1 and as high as 4.5. These materials, however, may also react as follows:

$$2Na_2S_2 + 3O_2 \rightarrow 2Na_2S_2O_3 \quad (4)$$

$$2Na_2S + 2O_2 + H_2O \rightarrow Na_2S_2O_3 + 2NaOH \quad (5)$$

In the case of polysulfide for use in treatment in lignocellulose material, it is desired to maintain the amount of thiosulfate to a minimum, and if possible, to prevent its formation. Thiosulfate is not an effective pulping chemical in alkaline pulping, and constitutes an undesirable load in the recovery system. However, in other contexts production of thisosulfate liquors may be desirable and its formation by the above reaction mechanisms is possible with the present invention.

In the case of sodium hydrosulfide, which may be produced by absorption of hydrogen sulfide gas in an alkaline solution, the reactions are, for example:

$$H_2S + NaOH \rightarrow NaHS + H_2O \quad (6)$$

$$2NaHs + O_2 \rightarrow 2S + 2NaOH \quad (7)$$

Again the sulfur may be further oxidized to thiosulfate.

The three essential components of the system of the present invention are an oxidant, a reductant, and a catalyst. The oxidant may be any gas which contains elemental oxygen, such as air, pure oxygen, or mixtures of oxygen and small amounts of chlorine and the like, although the amount of gases such as ozone should be limited if they attack or degrade the catalyst material. The reductant is an aqueous solution of sodium sulfide or the hydrosulfide and also constitutes an ionically conductive phase, although in accordance with this invention conductivity of this phase is not believed to be as significant a factor as it is in electrochemical fuel cell or electrolysis systems. The oxidant and reductant are also characterized by the formation of an interface or boundary when the two are brought into contact with each other.

The catalyst material, in accordance with the invention, is a solid which is essentially inert with respect to the oxidant, the reductant and products in the sense that it is not chemically attacked or reactive therewith. A material having a high surface area to weight ratio is preferred because it furnishes greater interfacial contact. The resistivity of the materials should be such that it will permit transference of the electrons involved in the reaction. Materials having a resistivity of less than about $10^5$ ohms-centimeters may be used although the preferred materials have a resistivity of $10^3$ ohms-centimeters or less.

To initiate and to control the reaction in accordance with the present invention, the reductant and the oxidant are brought into contact with each other and with the catalyst and maintained in the relation that the oxidant and reductant are in contact with each other substantially only in the same region where they are simultaneously in contact with the catalyst. An important aspect of the present invention is preventing the catalyst from being flooded by either the reductant or oxidant. If the catalyst is flooded by the liquid reductant, the liquid film slows considerably the rate of diffusion of the oxidant to the surface of the catalyst. Similarly, if the catalyst is flooded by the oxidant, the reductant is prevented from reaching the surface of the catalyst in the manner contemplated by the present invention.

Since the reaction zone involves a gas, a liquid and the catalyst, the catalyst must be in contact with the gas and wetted by the liquid but not flooded by either. Wetted, as used here, means that the contact angle between the catalyst and the liquid is low, e.g., less than about 90° and approaching zero. If the contact angle is high, e.g., greater than about 90° and approaching 180°, then the liquid will tend to draw away from the surface of the catalyst, and the surface of the catalyst is in effect in substantial contact only with the gas, that is flooded by the gas. On the other hand, with the surface of the catalyst readily wetted by the liquid, that is, with a contact angle approaching zero between the catalyst surface and the liquid, the liquid will tend to cover the surface of the catalyst, and the surface of the catalyst is in effect in substantial contact only with the liquid, that is, "flooded" by liquid. One method of preventing flooding, by the liquid is by a treatment of the catalyst which is designated as "wetproofing". This adds to the catalyst a minor proportion of an inert substance not wetted by the liquid reactant, that is, the contact angle between this inert additive and liquid is greater than about 90°.

In the case of porous materials used as a catalyst, it will be understood that the oxidant gas should not be wetted by the liquid reactant, that is, the contact angle between this inert additive and liquid is greater than about 90°.

In the case of porous materials used as a catalyst, it will be understood that the oxidant gas should not be forced through the pores of the catalyst in the sense that a porous member is used as a diffuser to form small oxidant gas bubbles which are in intermixing contact with the liquid.

Typical of the catalyst materials which may be used are carbon, activated carbon, platinized asbestos, nickel or carbon or activated carbon containing inclusions such as nickel, iron, cobalt, silver, platinum, palladium, manganese oxides (e.g., manganese dioxide), manganese sulfies, iron oxides and hydrated oxides, nickel oxide, nickel sulfide and cobalt sulfide or mixtures thereof. Of the above materials, carbon and activated carbon appear to provide optimum performance because of the relatively large surface-area-to weight ratio and the simplicity with which inclusions of metals and compounds of metals may be introduced into the material, as well as the degree to which carbon may be finely divided. Moreover, this is a readily available material which may be obtained in a wide variety of particle sizes and surfaces. Carbons from different sources often result in different reaction rates. These variations are easily determined by simple procedures. Typical of the carbons usable in accordance with the present invention are carbon black, furnace black, channel black or carbons prepared by known procedures from various sources, for example, wood, corn cobs, bean, nut shells, bagasse, lignin, coals, tars, petroleum residues, bones, peat and other carbonaceous material. The particle size may vary from 9 millimicrons to relatively large size, e.g., 1 inch or more, and usually the carbon is supplied as a mixture of various particle sizes. The surface area of the carbonaceous material may vary from 3 square meters per gram to in excess of 950 square meters per gram, as characterized by gaseous absorption using the BET method.

The carbon may be arranged in various physical arrangements, e.g., a porous nickel substrate with powdered platinum covered by powdered carbon and wetproofing agent, all disposed on one side of the nickel substrate as described in Handbook of Fuel Cell Technology, Prentice Hall, 1960, pp. 402-406; a porous carbon plate or tube wetproofed to prevent flooding, or a mass of wetproofed carbon granules or powder which float on the surface of the reductant.

Carbon may be wetproofed as follows.

Polytetrafluoroethylene (PTFE) in emulsion form is intermixed with particulate carbon in an amount of between 0.1% to 100% based on carbon solids. The mixture is heated to remove the vehicle and dispersing agent for the PTFE. Another wetproofing method involves treating particulate carbon in the ratio of 1 gram of linear polyethylene per 10 grams of carbon. The polyethylene is dissolved in the ratio of 1 gram of polyethylene per 100 grams of hot toluene and poured over the carbon. After treatment, the carbon is heated at approximately 105° C. to evaporate the toluene. The particles are not uniformly repellent but most of them are sufficiently repellent to float from several hours to several days.

Using the procedure described above, particulate carbon may also be wetproofed with polystyrene, fluorocarbon resins, polyethylene emulsions, silicones, or other hydrophobic materials, by any suitable procedure that avoids complete encapsulation by hydrophobic materials impermeable to the reactants or products formed. Other materials which may be used are polychlorotrifluoroethylene, prepolymerized silicone oils, and high vacuum silicone grease, for example.

Using the procedure described above, any of the heretofore mentioned catalysts, particulate carbon being only an example, may be wetproofed with polystyrene, polytetrafluoroethylene, polyethylene, silicones, polychlorotrifluoroethylene, prepolymerized silicone oils, high vacuum silicone grease, poly(chloro-p-xylylene), paraffin, paratoluene sulfonamide, polydichlorodifluoroethylene, and octadecyl amine.

Another procedure includes subliming a chlorinated paraxylylene dimer in a vacuum chamber and depositing the vapors on materials such as particulate carbon and porous sintered nickel, thereby forming a poly(-chloro-p-xylylene), known as "parylene".

In the case of materials such as finely divided platinum in an asbestos matrix, wetproofing is accomplished by using a 1% solution of polyethylene in toluene, wetting the asbestos matrix with the solution, draining off excess liquid then drying in an oven to evaporate the toluene.

In another example, paraffin wax is used in an amount varying from one-half to 2 grams per 10 grams of particulate carbon. The paraffin is dissolved in a solvent such as hexane or toluene, the carbon introduced into the mixture, heated and the solvent thereafter evaporated. Cetyl alcohol may also be used and applied in the same way. Any one of paratoluene sulfonamide, polydichlorodifluoroethylene and octadecyl amine may also be used and applied by intermixing with the carbon and heating the mixture to cause the treating material to adhere to the carbon. Each of the above materials operates satisfactorily in the new systems as indicated by the production of polysulfide which is visually detectable.

The particulate carbon may be bonded by a carboxylated styrene-butadiene latex used in an amount of 5 grams of 25% solids dispersion per 10 grams of carbon. The resulting material is a sheet which may be supported at the interface or a sodium sulfide solution and air, the reaction being apparent by the formation of the yellow color characteristic of polysulfide. In another example, polyethylene was dissolved in toluene, the polyethylene being used in the ratio of 5 grams per 10 grams of granular carbon and the toluene removed by floating the mixture on boiling water. The result was a bonded product which was sufficiently porous to permit passage of the oxygen containing gas and sufficiently wetproofed to float.

Referring to FIG. 1, which illustrates a preferred embodiment of the generating cell of the present invention, a polypropylene container 10 is equipped with an inlet 12 and an outlet 14 for introduction of aqueous reductant and removal of reaction products, respectively. Positioned within the container and forming one wall thereof is a catalyst 15 which may be a porous nickel substrate, platinum black and powdered carbon and wetproofing agent deposited on the side of the substrate contacting the reductant. The container 10 is also provided with an inlet 16 for gaseous oxidant and an outlet 17 therefor. The gaseous oxidant initially contacts the nickel side of the catalyst 15.

In operation, a two molar solution of sodium sulfide was circulated from a reservoir (not shown) through the solution space 19 by means of a pump (not shown) and then back to the same reservoir. The solution was maintained at a temperature of 50° C. and gaseous oxidant, e.g., oxygen, was admitted to the gas space 20 from a pressure cylinder, a water column being used to maintain a pressure of about 16" of water on the gas in the gas space. Excess and unreacted oxygen was withdrawn through an exit 17. The exposed face of the catalyst was 7.5 square inches. After 65 hours of operation, 72.2 grams of polysulfide sulfur was formed along with 232 grams of sodium hydroxide. No thiosulfate was formed. This represents 50% sulfide to sulfur conversion.

In another form of the present invention, the catalyst 15 was ¼ inch thick porous carbon electrode, wetproofed as described. Operating conditions were as previously described and after 23 hours operation, 40.6 grams of sulfur was formed along with 112 grams of sodium hydroxide and 5.7 grams of thiosulfate. This represents 68% of the sulfide converted to sulfur and 4% converted to thiosulfate.

As is apparent, the apparatus shown in FIG. 1 may be oriented with the catalyst 15 disposed horizontally above the reductant merely by turning the entire apparatus 90°. In this form, the liquid level in the solution space is so maintained that the solution contacts the carbon face but does not flood the entire member 15. When so oriented, it may not be necessary to use a pressure system for the oxidant which is maintained in contact with the member 15.

Figure 2:
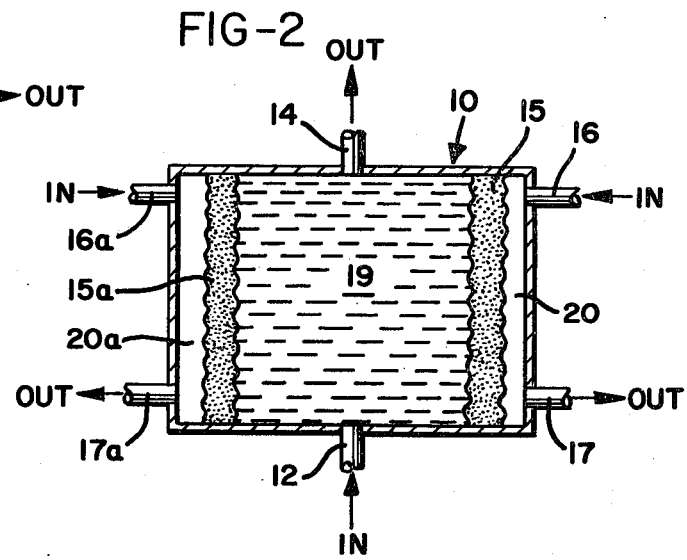
FIG. 2 is a schematic illustration of a generator in accordance with the present invention in which there are separated dual product producing zones.

In the form shown in FIG. 2, wherein the same reference numerals have been used where applicable, a variant is illustrated in which two separate catalyst members 15 and 15a are used to form facing walls of the container 10. The space between them forms the solution space 19, the reductant being introduced through inlet 12, and the reaction products removed through outlet 14. Oxidant inlet and outlets 16a and 17a, respectively are provided for member 15a, the latter being of the type previously described. After four hours of operation, as described in connection with the device of FIG. 1, 26.6 grams of sulfur and 83.6 grams of sodium hydroxide were formed. No thiosulfate was formed. In each case however, the formation of sulfur was indicated by the appearance of a yellow color, and a gradual darkening of the color as additional sulfur was formed and dissolved in the sodium sulfide to form the polysulfide. The nature of the reaction products was confirmed by analysis.

Figure 3:
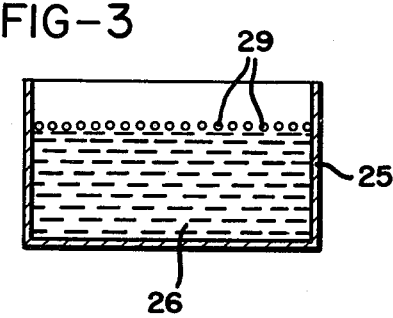
FIG. 3 is a simplified illustration of a generator in accordance with the present invention in which wet-proofed particulate catalyst material is floated on the surface of the reductant.

A simple arrangement for practicing the present invention on a batch basis, and for evaluating catalysts is illustrated in FIG. 3 in which a container 25 includes reductant 26. The catalyst 29 is in the form of particles which float on the surface of the reductant and which are simultaneously in contact with the oxidant gas, e.g., air.

In one example, sodium sulfide solution was introduced into the container, and carbon, removed from the face of a fuel cell electrode, was used as the catalyst. Activity was apparent by the appearance of a yellow color and heat generated at the interface. Analysis of the carbon showed the presence of fluorocarbon resin, copper, nickel, cobalt and iron, the latter metals in trace amounts. The reductant solution originally contained 62 g/l of sulfide sulfur and 169 g/l of total alkali reported as NaOH. A trace of thiosulfate was also present. This solution was allowed to stand, without stirring at room temperature for three days with the carbon floating on the surface of the reductant, and then analyzed. The results were 9 g/l of sulfide sulfur, 30.7 g/l of polysulfide sulfur, 34.5 g/l of sulfur in the form of thiosulfate ($S_2O_3^{--}$). Total alkali was 142.8 g/l calculated as sodium hydroxide. For the purposes of this invention, each polysulfide ion, $S_x^{--}$, is defined as consisting of one atom of sulfide sulfur, that is, $S^{--}$, and $x-1$ atoms of polysulfide sulfur, that is, $S_{x-1}^\circ$. The value of X is calculated from the amounts of sulfide sulfur and of polysulfide sulfur by the formula, $X=(S^{--}+S^\circ)/S^{--}$, that is, the ratio of sulfide sulfur + polysulfide sulfur to sulfide sulfur.

A second sample of the same reductant solution was used and after 1 hour and 15 minutes at room temperature the analysis was as follows: 47.2 g/l sulfide sulfur, 11.2 g/l of polysulfide sulfur and no thiosulfate ($S_2O_3^{--}$). Total alkali was 161.6 g/l as NaOh. After four hours the analysis was 29.3 g/l of sulfide sulfur, 21.1 g/l of polysulfide sulfur and no thiosulfate ($S_2O_3^{--}$). Total alkali was 157.2 g/l expressed as NaOH.

The results above are summarized in a table as follows:

| Time | $*S^=$ | $*S^\circ_{x-1}$ | $*S_2O_3^=$ | X Value |
|---|---|---|---|---|
| 1.25 hours | 47.2 | 11.2 | 0.0 | 1.24 |
| 4.0 hours | 29.3 | 21.1 | 0.0 | 1.75 |
| 72.0 hours | 9.0 | 30.7 | 34.5 | 4.23 |

*Concentrations, grams/liter as sulfur

Water treatment grade of activated carbon was rendered water repellent by using polyethylene as described above. The floating bed system of FIG. 3 was used, the data being as follows:

| Time | $*S^=$ | $*S_{x-1}^\circ$ | $*S_2O_3^=$ | X Value |
|---|---|---|---|---|
| 5 hours | 56.1 | 5.6 | 0.0 | 1.10 |
| 24 hours | 40.3 | 22.2 | 0.0 | 1.55 |

It was demonstrated by the use of columns packed with particulate carbon that a sufficiently high degree of wetproofing would prevent flooding and maintain a continuous production of polysulfide, even under a hydrostatic head.

Figure 4:
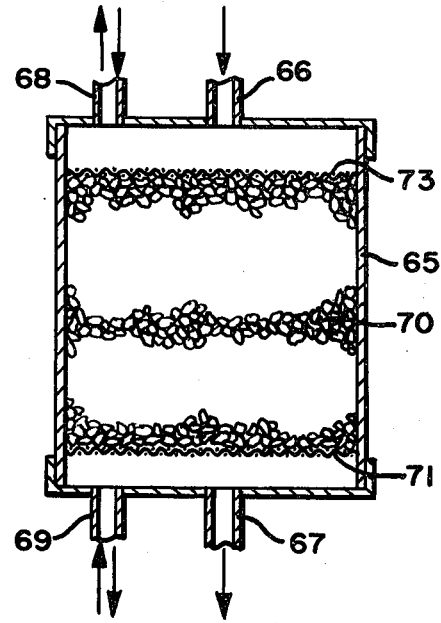
FIG. 4 is a sectional view of a column tower in accordance with this invention.

This form of the reactor is illustrated in FIG. 4, where there is shown a column 65 of cylindrical shape. Reductant is introduced through an inlet which may be 66 or 67 and unreacted reductant and product withdrawn from an outlet which may be 67 or 66 depending on whether the liquid is flowing downward or upward, respectively. Oxidant may be introduced through conduit 68 and 69 depending on whether concurrent or countercurrent flows are desired. Supported within the column is catalyst 70 preferably in the form of particulate carbon which is maintained in a position by screens 71 and 73. The catalyst 70 is maintained in a nonflooded condition, in this embodiment, by wetproofing the particulate carbon as heretofore described. It will be apparent to those skilled in the art that various modifications may be made of the device shown in FIG. 4, for example, the catalyst may be in the form of a wetproofed mass of adhered particulate carbon, or the other materials previously described may be used. Other forms of members may be used to hold the particulate material stationary, and the column may be arranged vertically, as shown or horizontally or at an angle therebetween with the catalyst wetproofed for the purpose of providing a reduction-oxidation reaction zone at the locus of the contact between the catalyst, oxidant and reductant thereby preventing substantial reaction at other than the reaction zone.

Utilizing the apparatus of FIG. 4, comparisons of carbon showed that virtually no polysulfide was generated with non-wetproofed carbon, while large amounts of thiosulfate were produced. The basic procedure involved 100 grams of 2M sodium sulfide solution in a one inch diameter glass column having a glass diffuser in the base. Air was bubbled into the column at the rate of 250cc per minute for two hours. The data are as follows:

| Test | Catalyst | Wetproofing | $*S^=$ | $*S_{x-1}^0$ | $*S_2O_3^=$ | X Value |
|---|---|---|---|---|---|---|
| 1 | None | — | 53.8 | 0.0 | 10.2g/l | 1.00 |
| 2 | carbon | none | 51.0 | 1.1 | 11.9g/l | 1.02 |
| 3 | carbon | 2% PTFE | 20.2 | 34.2 | 9.6g/l | 2.69 |
| 4 | carbon | 20% PTFE | 48.4 | 15.6 | 0 | 1.32 |

These data suggest that optimum operation of the system of the present invention involves maintaining the catalyst at the interface of the oxidant and reductant, and maintaining the oxidant in contact with a non-flooded surface portion of the catalyst.

It has been observed that when the sulfide solution is maintained for longer periods of time in the vicinity of the oxidative situs, the oxidation product is thiosulfate, increasingly so as the time of reaction is increased. In a column configuration, the time for reaction may be controlled by the rate of throughput of the sulfide solution, the faster the throughput the shorter the reaction time. The following analyses of effluent solutions from the bottom of a particular column through which air flowed countercurrently upward, show that with a certain catalyst the throughput may be maintained above the level at which thiosulfate is produced but that longer residual times resulted in achieving the further oxidative state, namely thiosulfate. Companion data below show that unless the catalyst has been wetproofed, the rate of oxidation is relatively very low.

| Throughput cc/hour | *S= | *$S^0_{x-1}$ | *$S_2O_3^=$ |
|---|---|---|---|
| Carbon Wetproofed with 10% PTFE | | | |
| 22 | 1.9 | 8.5 | 50.5 |
| 45 | 3.7 | 11.8 | 42.8 |
| 116 | 9.9 | 31.8 | 21.7 |
| 188 | 25.4 | 32.8 | 0.0 |
| 256 | 31.8 | 26.8 | 0.0 |
| 370 | 36.6 | 17.9 | 3.2 |
| Same Carbon Untreated | | | |
| 40 | 57.3 | 1.0 | 2.6 |
| 130 | 63.2 | 0.5 | 0.0 |
| 159 | 58.9 | 0.8 | 2.6 |
| 326 | 63.4 | 1.0 | 0.0 |

*Concentrations, grams/liter as sulfur

The amount of wetproofing material with which the catalyst should be treated may be varied from less than 1 percent of the weight of the catalyst to greater than 99 percent. Lower or higher percentages of wetproofing material appear to serve no useful purpose, because the area of contact available to one fluid phase is diminished excessively relative to that available to the other. The exact proportion of wetproofing material is best determined by experiment for a particular catalyst to be used in a particular apparatus, depending upon the practical results desired.

By way of example, the amount of PTFE used to treat an activated carbon was varied, the several wetproofed carbons so prepared being packed into respective glass columns of 1⅛ inch diameter to a depth of 16 inches. Sodium sulfide solution approximately two molar in concentration was flowed at a regulated and measured volume rate downward through the columns, and a large chemical excess of air was flowed at a constant volume rate upward, countercurrently. In separate experiments, the rate of flow of the sulfide solution was adjusted to different levels, and, after the operation had been continued long enough to reach steady conditions, samples of effluent solution were collected and analyzed. The following table shows the analytical results from these experiments, with the respective values of amount of wetproofing PTFE on the carbon and the dwell time in the column, the later being proportional to the inverse of throughput, equal in minutes in these experiments to 43,440 divided by cc per hour.

wetproofing PTFE on the carbon give approximately the same results. On the other hand, if maximum production of polysulfide sulfur is a primary criterion, with minimum production of thiosulfate sulfur as a secondary criterion, then 10 percent of wetproofing PTFE on the carbon gives the best results in these experiments. In two experiments, the column was operated with activated carbon without wetproofing material, and the results above show that the production of oxidized sulfur products was greatly diminished relative to that when PTFE was present in amounts of 2, 5 or 10% on the carbon.

Even though the reaction products produced by this invention find utility primarily in paper pulping, it will also be understood that treatment of lignocellulose materials is not limited to full chemical cooking. The product of the system of the present invention may also be used in semi-chemical processing, chip impregnation and any of the other treatments of chips and the like normally used to effect partial or complete separation of lignins and cellulose, or any of the preparatory treatments. Likewise, the polysulfide liquor produced may be further oxidized to a thiosulfate liquor for such uses as in scrubbing flue gases from the recovery boiler, in the pulping itself, or elsewhere in the pulping process.

For example, in oxygen bleaching, the pulp to be subjected to oxygen gas for bleaching purposes is customarily wetted with a caustic liquor. If the caustic liquor contains sodium sulfide, say in excess of 2.5% of the weight of pulp to which the liquor is being applied, then degradation of the pulp occurs during oxygen bleaching which would not occur if the sodium sulfide were not present. If the sodium sulfide present in the caustic liquor is oxidized to sodium thiosulfate, the degradative effect during oxygen bleaching does not occur, the sodium thiosulfate in this instance behaving as though inert.

Accordingly, it is possible with the present invention to store the polysulfide liquor produced (containing sodium polysulfide and sodium hydroxide). Portions of that stored liquor may then, when desired, be further oxidized in accordance with the present invention to produce sodium thiosulfate and sodium hydroxide. This caustic solution may then be used in the oxygen bleaching process.

Alternatively, the sulfide solutions may be oxidized principally to thiosulfate in the initial oxidation, passing of course through a polysulfide intermediate stage. In

| | % PTFE Used for Wet proofing Carbon | | | | | | | | | | | |
|---|---|---|---|---|---|---|---|---|---|---|---|---|
| Dwell Time In Column- | 0 | | | 2 | | | 5 | | | 10 | | |
| Minutes | S= | $S^0_{x-1}$ | $S_2O_3^=$ | S= | $S^0_{x-1}$ | $S_2O_3^=$ | S= | $S^0_{x-1}$ | $S_2O_3^=$ | S= | $S^0_{x-1}$ | $S_2O_3^=$ |
| 33 | *— | — | — | 40.6 | 14.1 | 1.3 | — | — | — | — | — | — |
| 46–48 | — | — | — | 32.3 | 24.3 | 2.6 | 35.2 | 21.4 | 2.6 | 36.2 | 24.6 | 0.0 |
| 53–54 | 50.6 | 1.9 | 0.0 | — | — | — | 25.9 | 28.2 | 9.0 | — | — | — |
| 64 | — | — | — | — | — | — | — | — | — | 27.2 | 29.1 | 0.0 |
| 69 | — | — | — | 18.2 | 25.9 | 10.2 | — | — | — | — | — | — |
| 72 | — | — | — | — | — | — | 17.9 | 32.6 | 16.6 | — | — | — |
| 77 | 53.1 | 1.6 | 1.3 | — | — | — | — | — | — | — | — | — |
| 84 | — | — | — | — | — | — | — | — | — | 18.6 | 34.6 | 7.7 |
| 102 | — | — | — | — | — | — | — | — | — | 11.8 | 27.5 | 35.8 |

Values in the body of the table are concentrations, grams/liter as sulfur
*Dashes indicate no data collected By inspection of this table, it may be seen that if minimum dwell time in the column is a primary criterion, with maximum production of polysulfide sulfur as a secondary criterion, then either 2, 5 or 10 percent of that instance, the liquor will contain sodium hydroxide and a sulfur compound—primarily sodium thiosulfate although residual amounts of sodium polysulfide or even sodium sulfide may obviously be present. However, since it is primarily in the thiosulfate oxidation state, it is insert and will not interfere with the causticizing ability of the liquor for use in the various aspects of oxygen pulping, i.e., pretreatment, refining or delignification.

Another area of use for such a liquor is in decolorizing the effluent which is customarily produced during the caustic extraction stage of pulp bleaching in kraft pulping operations. This effluent from the caustic extraction stage of pulp bleaching has in the past been a major cause of excessive color in streams into which such effluents are discharged. One process for decolorizing the caustic effluent passes it through a resinous adsorption bed, which adsorbs the color and removes it from the effluent. The bed becomes saturated after a certain period of use, and must be regenerated. The regeneration process in some instances consists of first a caustic rinse to remove the accumulated colored bodies from the resin bed, then an acid rinse to regenerate to resin surfaces to make them particularly effective in adsorbing additional colored bodies when the resin bed is put back on stream to treat the colored effluent. This latter acidification step in the regeneration process has theretofore made it impossible to use kraft pulping liquor for the source of caustic to use in the regenerative rinse, because acidification causes the release of large quantities of hydrogen sulfide gas, which is an intolerable air pollutant besides being dangerous to the operators in the vicinity. If the kraft pulping liquor is subjected to complete oxidation, the sodium sulfide is converted to sodium thiosulfate. When this solution is acidified, as in the resin regeneration process described above, there is no emission of hydrogen sulfide.

Still another use for a sodium thiosulfate and sodium hydroxide containing liquor is in the extraction stage itself, such as for chlorine extraction from chlorine bleached pulps. It is common to use a caustic solution to extract chlorine products such as chlorine oxides from bleached pulp. The sodium hydroxide present in the thiosulfate liquor can be used as the caustic in such an operation.

An added feature is that the thiosulfate itself acts as a "short stop" for the chlorine activity to prevent further degradation of the pulp. Thus the thiosulfate acts as a reducing agent to reduce the chlorine and prevent further chlorine activity on the pulp. The thiosulfate is oxidized to sulfate in the process, but no odorous sulfur emissions occur.

Thus it can be seen that not only does the polysulfide liquor have utility in the pulping operation but a thiosulfate liquor may also be useful in certain pulping aspects because of the high caustic content. Other possibilities which should be mentioned are use of a thiosulfate and sodium hydroxide containing solution formed in accordance with the present invention in the scrubber columns of the recovery boiler and in preparation of sodium aluminate sizing aids for on-the-paper machine treatment. As is known, caustic solutions are useful in scrubbing the sulfur dioxide gas from the recovery boiler in order to absorb or remove the sulfur dioxide. Again the thiosulfate present in the liquor is inert and does not interfere with the operation of the sodium hydroxide. Likewise, the sodium hydroxide may be combined with clay to form sodium aluminate sizing aids without interference from the thiosulfate.

The advantages to producing polysulfide and/or thiosulfate within the recovery loop itself without addition of increased amounts of sulfur are apparent. Likewise, the ability to use a completely oxidized kraft liquor in place of other caustic liquors is economically attractive since it is already available from the process of the present invention.

While the methods herein described constitute preferred embodiments of the invention, it is to be understood that the invention is not limited to these precise methods, and that changes may be made therein without departing from the scope of the invention which is defined in the appended claims.

What is claimed is:

1. In a process for the oxidation of sodium sulfide or sodium hydrosulfide, the steps consisting essentially of: (1) providing a gaseous oxidant, an aqueous reductant containing sodium sulfide or sodium hydrosulfide, and particulate activated carbon having a particle size of between 9 millimicrons and one inch and having a surface area of from 3 square meters per gram to in excess of 950 square meters per gram (BET), and which has been partially encapsulated with 0.1–100% by weight of carbon of a polytetrafluoroethylene resin, said oxidant and reductant being capable of forming an interface when brought into contact with each other, said partially encapsufated carbon particles being relatively free from chemical attack by said oxidant, said reductant, and the reaction products, and (2) bringing said oxidant, reductant and paritally encapsulated carbon particles into contact with each other, thereby effecting the oxidation of sodium sulfide or sodium hydrosulfide to produce a sodium thiosulfate and sodium hydroxide containing solution.

2. The process of claim 1 wherein said particulate carbon contains as an inclusion thereon a material selected from the group consisting of nickel, platinum, manganese oxides, manganese sulfides, iron oxides, hydrated iron oxides, nickel oxide, nickel sulfide, cobalt sulfide, and mixtures thereof.

3. The process of claim 1 wherein said particulate activated carbon has been partially encapsulated with approximately 2% by weight of carbon of a polytetrafluoroethylene resin.

4. The process of claim 1 wherein said particulate activated carbon has been partially encapsufated with approximately 5% by weight of carbon of a polytetrafluoroethylene resin.

5. The process of claim 1 wherein said particulate activated carbon has been partially encapsufated with approximately 10% by weight of carbon of a polytetrafluoroethylene resin.

6. The process of claim 1 wherein said reductant is selected from the group consisting of white liquor, green liquor, black liquor and mixtures thereof.

7. The process of claim 6 wherein said reductant is provided by treating green liquor recovered from a smelt tank with slaked lime to produce white liquor, said white liquor including dissolved sodium sulfide and sodium hydroxide and constituting said reductant.

* * * * *